Sept. 23, 1969     H. A. DOWNEY     3,468,138

COUPLING WITH REINFORCED FLEXIBLE ELEMENT

Filed Oct. 19, 1967     2 Sheets-Sheet 1

INVENTOR.
HOLMES A. DOWNEY
BY M. A. Hobbs
ATTORNEY

United States Patent Office 3,468,138
Patented Sept. 23, 1969

3,468,138
COUPLING WITH REINFORCED FLEXIBLE
ELEMENT
Holmes A. Downey, Bremen, Ind., assignor to Reliance
Electric Company, a corporation of Delaware
Filed Oct. 19, 1967, Ser. No. 676,464
Int. Cl. F16d 3/52, 3/19, 3/28
U.S. Cl. 64—11      7 Claims

ABSTRACT OF THE DISCLOSURE

A flexible coupling for connecting to rotating shafts in end-to-end relation in which flanges are mounted on each of the shafts and are connected to one another by a split torsion element of rubber or rubber-like material. Reinforcing strands are superficially embedded in the external and/or in the internal covering of the element adjacent the split, the strands extending generally parallel with the axis of the coupling.

---

A well known flexible coupling for connecting two rotating shafts in end-to-end relation consists of two flanges secured to the ends of the shaft and interconnected by an annular flexible torsional element clamped to the flanges. In the conventional design the torsion element, which is generally arcuate in cross sectional shape, is built up with layers of rubber and fabric material and contains a rubber cover externally and internally over the fabric material. The element is split or separated in the axial direction at one point to permit the element to be installed on and removed from the coupling assembly without disassembling the flanges or removing either of them from the ends of the shaft. While the ends of the flexible torsion element at the split are either in contact with one another or are in close proximity, and the installed element is essentially a continuous structure for the purpose of transmitting torque from one shaft to the other, the split tends to concentrate the lines of force at the two ends, and hence creates one or more points in the area adjacent the split where failure of the element is most likely to occur. The torsional deflection in the element during the operation of the equipment on which the coupling is mounted, distorts the element and creates excessive strain in the area adjacent the split, resulting in flexural fatigue in the rubber cover over the fabric on either or both the external and internal sides of the element. The flexural fatigue in the rubber cover is most pronounced at a point along the split near the flanges, thus causing the cover to tear inwardly, and ultimately resulting in complete failure of the element. It is therefore one of the principal objects of the present invention to provide an element of the aforementioned type having a reinforcing structure incorporated therein, which prevents the excessive strain adjacent the split from causing premature failure, and which can be included in the element structure without producing other areas of weakness in the rubber cover.

Another object of the invention is to provide a split flexible element for shaft couplings, in which the element is reinforced with cord, axially arranged in the areas on either side of the split to prevent failure resulting from flexural fatigue along the sides of the split, and which may be reinforced on both the internal and external sides of the element without modifying the external dimensions or adversely affecting operating characteristics of the element.

Still another object is to provide a relatively simple structure for reinforcing flexible torsion elements of the aforementioned type, which can be readily incorporated in the element at various points of excessive strain, and which can easily be included in the element structure using conventional fabricating procedures and methods.

Additional objects and advantages of the invention will become apparent from the following description and accompanying drawings, wherein.

Figure 1:
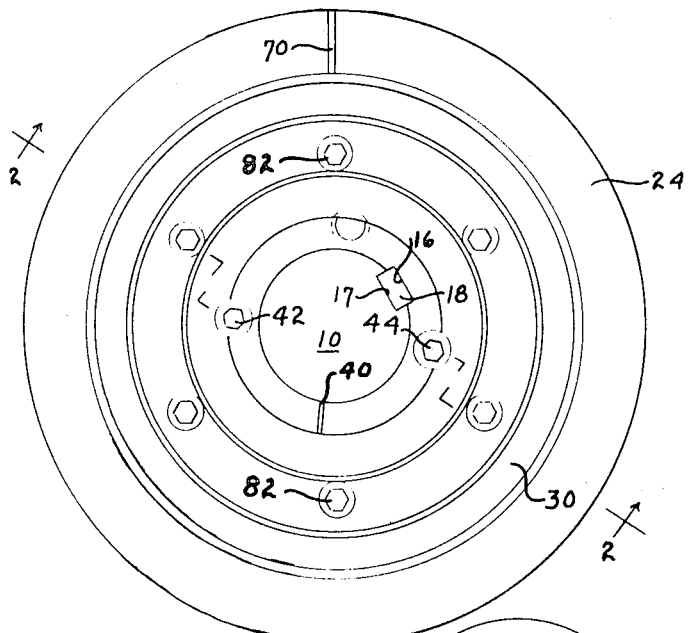
FIGURE 1 is an end elevational view of a flexible coupling embodying the present invention.

Referring more specifically to the drawings, numerals 10 and 12 designate the driving and driven shafts, respectively, and numeral 14 designates the flexible coupling secured to the opposed ends of shafts 10 and 12. The driving shaft 10 may be, for example, a shaft of an electric motor, internal combustion engine or the like, and the driven shaft may be the power input shaft of a number of different types of industrial, commercial, farm or domestic equipment. The shafts 10 and 12, illustrated in the drawings, are shown as the same diameter with keyways 16 and 17 and shaft key 18, and the ends of the shafts are spaced a substantial distance apart; however, the distance between the ends of the two shafts may be varied from one installation to the other without changing the design or construction of the coupling.

The present flexible coupling consists principally of flanges 20 and 20' for the driving and driven shafts 10 and 12, and a flexible torsion element 24 secured to flanges 20 and 20'. When the two shafts are the same diameter, the two flanges are identical in construction and hence may be used interchangeably on the driving and driven shafts; consequently, only one of the flanges will be described in detail herein, and like numerals will be used on like parts of the two flanges with primes being used with the numerals of the other like parts.

Flange 20 consists of an annular member 30 with an internal bore having a tapered surface 32 decreasing in diameter from the inner side of the flange to the outer side, and a split bushing 34 in the bore having an external surface 36 tapered to correspond to the tapered surface 32 on anular member 30, and having an internal annular surface 38 parallel with the shaft and defining a bore of substantially the same size as the shaft. The bushing is continuous throughout, with the exception of a slot 40 of sufficient width to permit the bushing to contract during installation to grip the shaft firmly. The tapered surfaces of the annular member and bushing are assembled in face-to-face contact and are adapted to slide relative to one another as the flanges are assembled on and secured to the respective shafts, as will be more fully explained hereinafter.

Bushing 34 is contracted into firm engagement with the shaft on which the flange is mounted by two screws 42 and 44, each being seated in a bore 46, one longitudinal portion 48 of which is formed in the internal surface 32 of the annular member, and the other portion 50 of which is formed in the external surface 36 of bushing 34. The bore portion 48 is threaded throughout its length and is longer than portion 50 so that when screw 42 or 44 is threaded into the bore, the end of the screw abuts against the inner end of portion 50, thereby forcing bushing 34 inwardly along the tapered surface 32, causing bushing 34 to contract and firmly engage the shaft. Both screws 42 and 44 are tightened substantially the same amount, and when fully tightened, retain the flange 20 firmly in place on the end of the shaft. Flange 20' is secured to shaft 12 in the same manner by screws 42' and 44' in corresponding bores 46'. While the foregoing flange securing means is preferred in attaching the coupling to axially disposed shafts, other types of suitable securing means may be used if desired.

The flexible torsion element 24 consists of an annular body portion 60 of arcuate cross sectional shape joined to inwardly extending side walls 62 and 62', which terminate at their inner edges in small outwardly extending ribs 64 and 64', respectively. The element is preformed to the general configuration shown in the drawings and is constructed of rubber or rubber-like or plastic material having a plurality of layers of fabric 66 of nylon cord or other suitable material embedded near the center of the body portion 60 and side walls 62 and 62'. As used herein and in the claims the term "rubber," unless otherwise indicated, includes any suitable material from which the matrix of the element is made and formed. As shown in the drawings, the flexible element is continuous throughout with the exception of a single split 70, and while this split completely severs the element, the element remains in an annular form with the two ends 72 and 74 in close proximity to one another. The split structure of the flexible elements permits the element to be installed in place on the flanges without removing or moving either of the flanges from or on the two shafts. The flexible member is secured to the flanges by rings 80 and 80', and their respective screws 82 and 82' extending through the respective annular members 30 and 30' and being threadedly received in threaded bores 84 and 84'. When the screws 82 and 82' are tightened, the respective rings are drawn firmly against side walls 62 and 62' of the element, thereby clamping the side walls against the inner surface of the annular grooves 86 and 86'.

Figure 3:
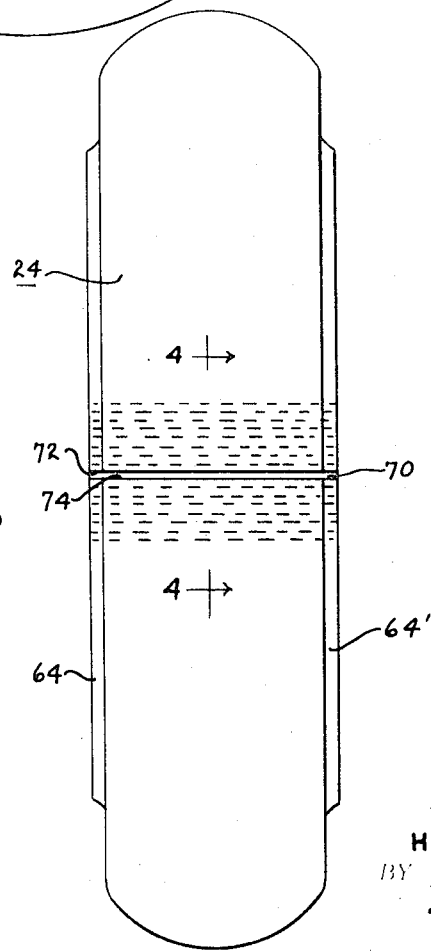
FIGURE 3 is a side elevational view of the flexible element shown in FIGURES 1 and 2, removed from the assembly and illustrating the present invention.
Figure 2:
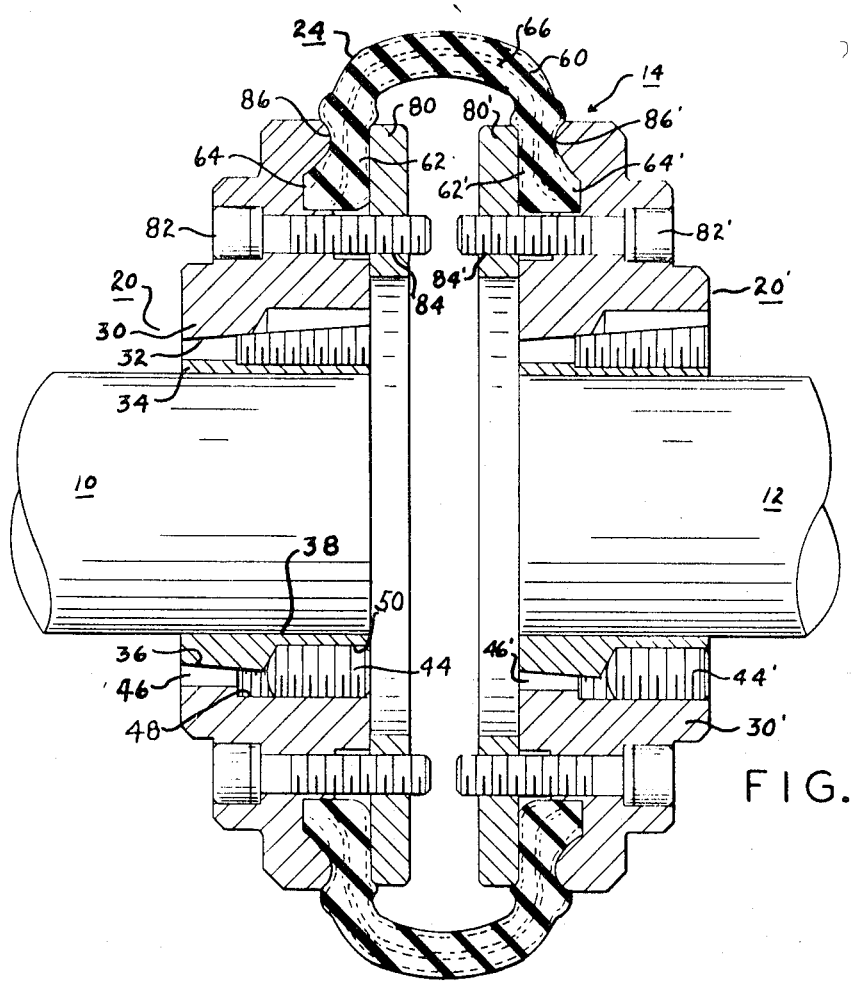
FIGURE 2 is an axial cross sectional view of the coupling shown in FIGURE 1, the section being taken on line 2—2 of the latter figure.
Figure 4:
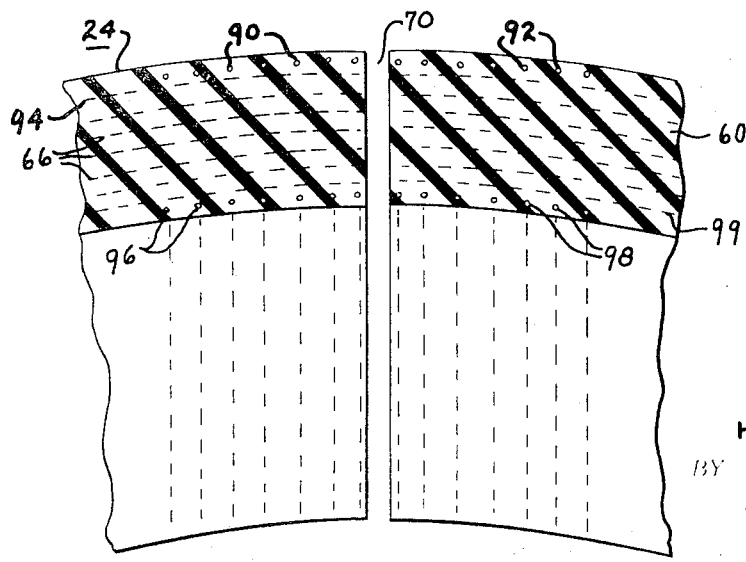
FIGURE 4 is an enlarged fragmentary cross sectional view of the flexible element shown in FIGURE 3, the section being taken on line 4—4 of the latter figure.

In the present coupling, the flexible torsion element is reinforced by a series of cord strands 90 and 92 embedded superficially in the rubber cover of the element. The outer cover is idenified by a broken line 94, and the strands 90 and 92 are confined to the cover. The strands are positioned in an axial direction as seen in FIGURE 3, and effectively reinforce the ends of the element adjacent split 70, which, as explained hereinbefore, weakens the element on either side thereof and tends to concentrate the forces at a point near the outer peripheries of annular members 30 and 30', and rings 80 and 80' clamp the element. The cord strands 90 and 92 extend into the portion of the sidewalls clamped between the annular members and the respective rings, and provide sufficient strength to the cover to prevent the concentrated lines of force from tearing the cover or otherwise causing failure of the flexible element in that area.

The element may be further reinforced by a series of cord strands 96 and 98 at the two ends of the element on either side of the split on the internal side of the element. These cords are disposed in the inner cover, identified by broken line 99, and likewise extend into the portion of the side wall clamped between the annular members and the respective rings, and give sufficient strength to the inner rubber cover to prevent rupturing from the excessive concentration of forces adjacent the split and along the peripheral edges of members 30 and 30' and the respective clamping rings. Both the cords in series 90, 92, 96 and 98 are separate strands, preferably positioned in spaced relation to one another, and are not held in position by transverse strands or other retaining members which can cause a cutting or tearing action in the rubber cover and thereby create a condition which might result in a premature failure of the cover in and around the individual cord strands of the series. The rubber matrix of the covers in which the strands are buried, completely surrounds the individual cords and retains them in proper position.

In the fabrication of the present flexible element, the body of the element is fabricated in the usual manner. In forming the cord reinforcing series in the element, the cords are first embedded in the cover material when the material is being calendered preparatory to applying the internal and external covers to the preformed element body. The number of cord strands in the series may be varied so that the area covered by the reinforcing structure may be various widths along the periphery of the element; however, the cord series normally start at a point adjacent the split and extend away therefrom, since failure from the concentration of the lines of force is most likely to occur in that area. Further, the foregoing reinforcing structure may be used at other points in the flexible element where failure may also be likely to occur as a result of special conditions under which the coupling is required to operate. The cord may be constructed of various materials, including nylon, and may be of various sizes depending upon the thickness of the internal and external rubber covers and the strength required to overcome the concentration of forces near split 70 or other areas requiring added strength.

While only one embodiment of the present coupling has been described in detail herein, various changes and modifications may be made without departing from the scope of the invention.

I claim:

1. A flexible torsion element for a coupling having a pair of spaced axially aligned flanges for mounting on the ends of two axially positioned rotating shafts and a clamping means at the periphery of said flanges for securing the torsion element to the flanges, said element comprising an annular body of rubber-like material having a generally arcuate transverse cross sectional shape and having radially inwardly extending side walls for seating in the clamping means on the flanges, reinforcing material embedded in said body, an axial split extending completely through said body, and a plurality of additional reinforcing strands embedded in said body superficially adjacent the split near the outside surface thereof and extending transversely in the body from one side wall to the other.

2. A flexible torsion element for a coupling as defined in claim 1 in which said element contains a plurality of layers of cord fabric embedded deeply therein.

3. A flexible torsion element for a coupling as defined in claim 1 in which said plurality of reinforcing strands are embedded in said body near the outside surface thereof on both sides of said split in close proximity thereto.

4. A flexible torsion element as defined in claim 1 in which a plurality of reinforcing strands are embedded in said body adjacent the split near the inside surface thereof and extending transversely in the body from one side to the other.

5. A flexible torsion element for a coupling as defined in claim 3 in which said reinforcing material consists of a plurality of layers of cord fabric embedded deeply therein.

6. A flexible torsion element for a coupling as defined in claim 1 in which strands are fully surrounded by the matrix of said body.

7. A flexible torsion element for a coupling as defined in claim 5 in which the matrix fully surrounds the strands and is in direct contact therewith.

References Cited

UNITED STATES PATENTS

| 1,569,989 | 1/1926 | Leipert | 64—11 |
| 2,648,958 | 8/1953 | Schlotmann | 64—13 |
| 2,940,572 | 6/1960 | Warman | 64—11 |
| 3,178,906 | 4/1965 | Ricketts | 64—11 |
| 3,283,535 | 11/1966 | Grundtner | 64—11 |

FOREIGN PATENTS 1,248,272 10/1960 France.

HALL C. COE, Primary Examiner